Figure 1:
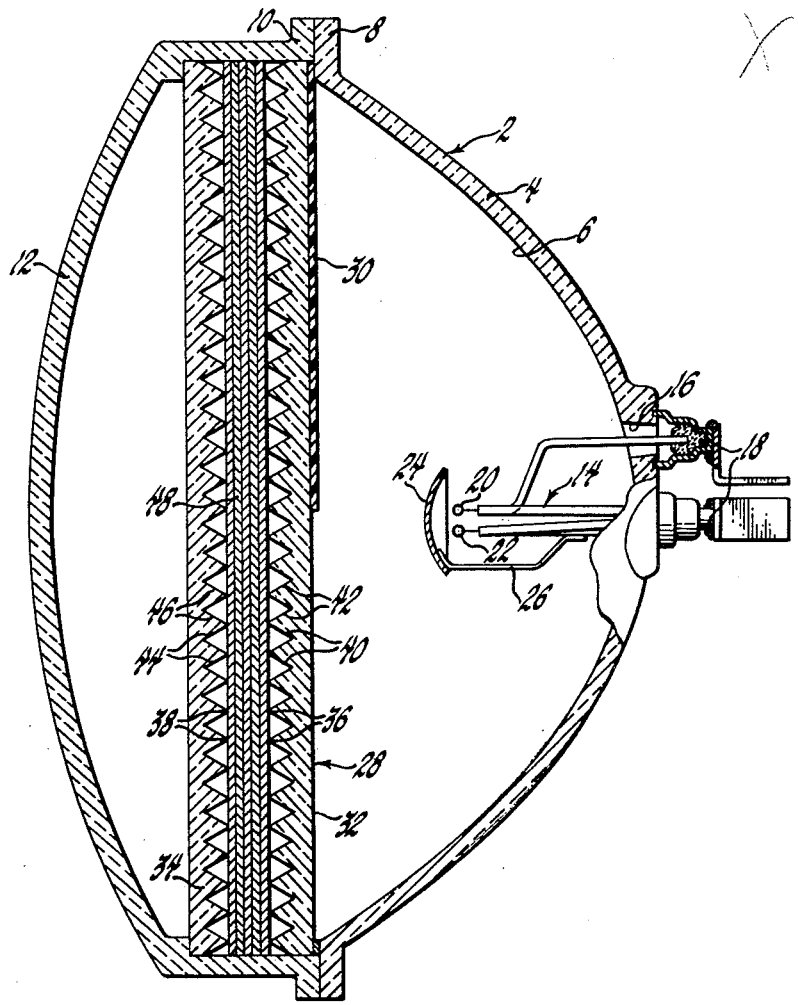

Oct. 20, 1964  J. W. MURPHY  3,153,740
LIGHT-POLARIZING LAMP
Filed Aug. 19, 1960  2 Sheets-Sheet 1

INVENTOR.
Joe W. Murphy
BY
G.E. McGlynn, Jr.
ATTORNEY

INVENTOR.
Joe W. Murphy
BY
G. E. McGlynn Jr.
ATTORNEY

# United States Patent Office 3,153,740
Patented Oct. 20, 1964

3,153,740
LIGHT-POLARIZING LAMP
Joe W. Murphy, Anderson, Ind., assignor to General Motors Corporation, Detroit, Mich., a corporation of Delaware
Filed Aug. 19, 1960, Ser. No. 50,784
5 Claims. (Cl. 313—112)

The present invention relates to a method and apparatus for polarizing electro-magnetic radiation and, in particular, to a light-polarizing projection lamp of the type particularly adapted for use on vehicles.

The basic principles and phenomena involved in polarizing electro-magnetic radiations such as light rays are quite old and well known in the art. Efforts have been made not only to adapt these principles and phenomena to scientific research of various kinds, but also to utilize these teachings in devising an efficient light-polarizing projection lamp, such as an automobile head lamp. However, notwithstanding the age of these basic principles of polarization and the efforts which have been expended to embody them in an efficient light-polarizing lamp, the various light-polarizing lamp systems which have been proposed have evidenced serious objectionable characteristics.

For example, one well known and principal method of polarizing light waves may be classed or termed as polarization by reflection and transmission. Such a method of polarization is based on the fact that when light is incident obliquely on a plane polished non-metallic surface, such as glass, the surface reflects most readily the waves whose particles are vibrating parallel to it, and transmits those vibrating in planes at right angles to it. Consequently, such surface acts as a polarizer, polarizing and reflecting waves vibrating parallel to the surface and transmitting and polarizing those waves vibrating in planes at right angles to the surface. Thus, as is well known in the art, the reflected and the transmitted light rays are polarized in planes at right angles to each other. In one system of this type, the reflected polarized light may be totally absorbed or in some manner discarded, whereby only the transmitted light rays are available from the bundle of rays initially incident upon the polarizing surface. Ignoring the various losses in light which occur due to minute roughness of the polarizing surface, inexact incident angle and the like, it will be readily apparent that a major portion of the incident light is unavailable, having been lost in the reflected light aforementioned. Accordingly, such a principle of light polarization is eminently inefficient for use in a projection lamp of the type adapted for use on vehicles.

Another old and equally well known method of polarizing light waves is known as polarization by multiple reflection and transmission. In this method of polarization, incident light rays fall upon a suitable polarizer member preferably of the multi-layer type, and each incident light ray is broken into two components each of which is polarized in a plane 90° out of phase relative to the plane of polarization of the other ray. The nature of such polarizer members is such that it will transmit the light rays polarized in one plane while reflecting the light rays polarized in the other plane back toward the light source by a suitable optical system. Consequently, the reflected polarized light rays are available for redirection by suitable means, such as a reflector, to the polarizing member. However, prior to falling incident upon the polarizing member, it is necessary that the reflected light rays be de-polarized or randomized to repeat the cycle.

Thus, it has also been suggested to utilize the multiple reflection-transmission method of polarization as aforedescribed in combination with a suitable de-polarizer in which the reflected light rays, polarized in a plane at right angles to the plane of polarization of the light rays transmitted through the polarizer, can be de-polarized or randomized for redirection by the reflector back to the polarizer member, followed by innumerable repetitions of the aforementioned cycle. The theoretical advantages of such a system over that previously described will be obvious, inasmuch as the initially reflected and polarized light rays are put to further use. However, as a practical matter, such a polarizing system is unacceptable for use in lamps such as employed on vehicles because they are extremely inefficient and would require such an extreme high wattage light source as to produce objectionable glare. More specifically, the primary problem with such a polarizing system is that known de-polarizing or randomizing materials are not efficient enough; that is, such known de-polarizers, if efficient as a de-polarizer, are practically completely inefficient in terms of light transmission or diffusion and, alternatively, if efficient in terms of transmitting light therethrough and not resulting in objectionable diffusion, they are relatively inefficient as a de-polarizer.

It is, therefore, a principal object and feature of this invention to provide a method for efficiently and effectively polarizing electromagnetic radiations, such as light waves emanating from the light source of a vehicle head lamp, and which method provides more efficient use of the available light or radiations from the source without increasing the capacity of the latter.

It is yet another object and feature of this invention to provide a method of plane-polarizing light rays from a source in which polarized light rays reflected from the polarizer may be redirected to and transmitted through the polarizer without first being de-polarized or randomized, thereby avoiding the problems attendant to de-polarization as aforedescribed.

It is yet another object and feature of this invention to provide a method of polarizing light rays utilizing a multiple reflection-transmission polarizing medium in combination with a wave-retarder or rotator which functions to rotate the plane of polarization of the reflected light rays from the polarizer into the plane of polarization of the light rays transmitted through the polarizer so that the rotated light rays may pass through the polarizer member upon next striking the latter.

It is yet another object and feature of this invention to provide a projection lamp utilizing the foregoing method, and comprising a polarizing member adapted to polarize light rays incident thereon into two planes at right angles to each other and to transmit the light rays in one of these planes and reflect the light rays in the other of said planes back to the surface of a light-directing member, such as a parabolic reflector, for redirection again to the polarizing member, and including a wave retarder or rotating medium interposed in the path of the reflected light rays so as to rotate the latter into phase with the transmitted light rays so that the rotated rays will pass through the polarizing member upon next striking the latter.

Figure 2:
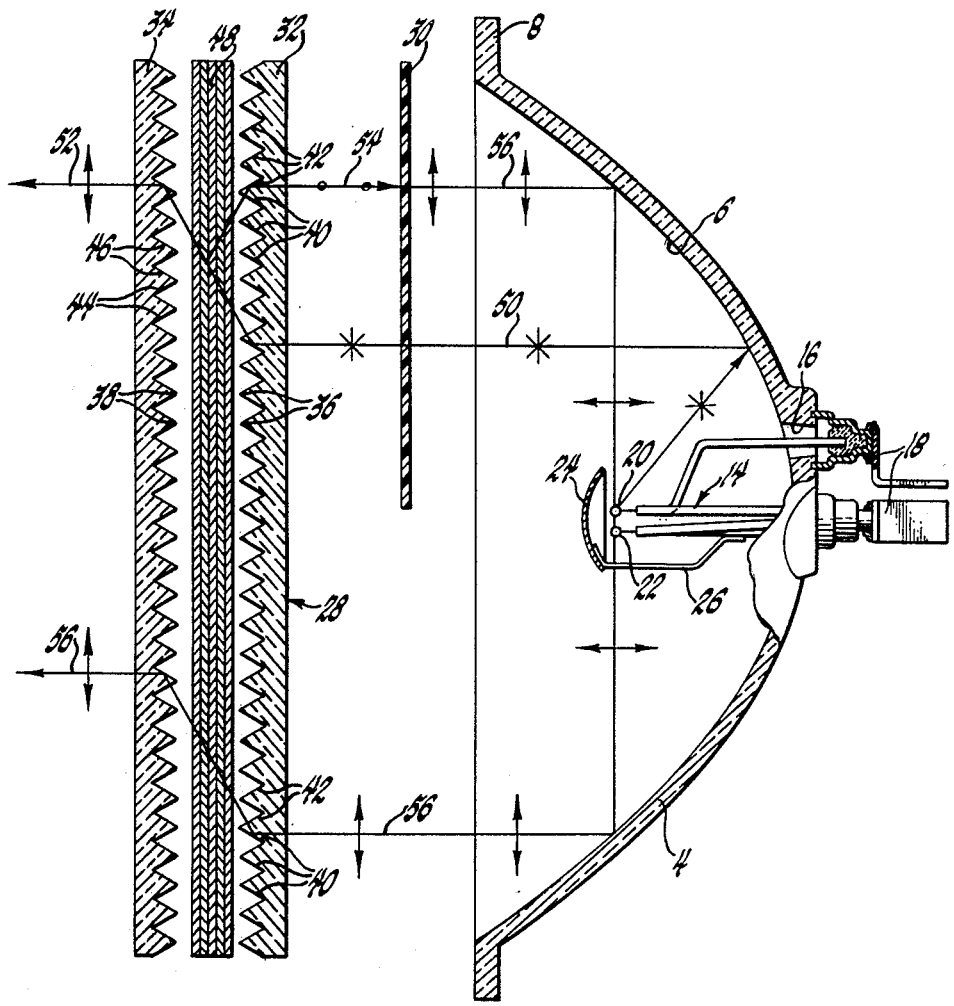

These and other objects of the invention, and the manner in which they are attained, will become more apparent hereinafter as the description of the invention proceeds, and in which reference is made to the appended drawings in which:

FIGURE 1 is a transverse section through a projection lamp utilizing the inventive method and apparatus of this invention; and FIGURE 2 is a diagrammatic exploded view of FIGURE 1 further illustrating the invention.

Referring now to the drawings, the numeral 2 indicates a lamp assembly comprising a substantially paraboloidal reflector 4 having its internal surface 6 coated with a suitable reflecting material and having a radial circular flange 8 defining the mouth thereof suitably joined as by fusing or otherwise to the flange 10 of the lens 12 thereby forming a lamp envelope. As is the usual practice in the vehicle head lamp art, a plurality of lead wires indicated generally at 14 extend through suitable apertures 16 in the base of the reflector for electrical and mechanical connection to a plurality of contact structures 18 accessible externally of the lamp for connection to an electrical power source. In further accordance with conventional lamp practice, the inner ends of selected pairs of lead wires respectively support the filaments 20 and 22 in predetermined relationship with the focus of the reflector 4 and each other. For the purpose of the present illustration, the filament 20 is shown positioned approximately at the focus of the reflector, although it will be obvious that the other filament may be located in this position, or both filaments located slightly off focus depending upon various design considerations. A filament shield 24 of generally spherical configuration may be mounted immediately in front of the filaments by means of the support wire 26 secured to one of the lead wires of the lead wire assembly 14. The lens 12 is preferably provided with suitable well known light-distributing media as required to provide light beams or patterns of the required characteristics.

Interposed between the lens 12 and the light sources 20 and 22 is the circular polarizing assembly indicated generally at 28 and, between the latter and the reflector and light sources, a semi-circular sheet of suitable material 30 capable of elliptically polarizing linearly polarized light, and commonly termed a wave plate retarder or rotator. It will be noted that the polarizing assembly 28 completely covers the mouth of the reflector, while the semi-circular sheet material 30 preferably covers exactly one-half of the circular mouth of the reflector.

The polarizing assembly 28 comprises inner and outer circular prism plates 32 and 34, respectively, each of which includes a plurality of prism members 36 and 38. The prism member 36 and 38, respectively, include certain light-receiving, transmitting, reflecting and emitting surfaces depending on various factors such as the particular surface of a given prism member on which a light ray is initially incident. However, in order to facilitate an understanding of the invention, these surfaces are given particular designations in the following description, it being understood that a designated light-emitting surface, for example, can also act as a light-receiving surface.

The prisms 36 of the inner prism plate include the light-receiving and reflecting surface 40 and a light-emitting surface 42, while the corresponding prisms 38 of the outer prism plate consist of a light-receiving surface 44 and light-reflecting surface 46. A suitable multi-layer polarizer 48 is sandwiched between the respective prisms of the inner and outer prism plates as indicated in the drawings.

At this juncture, it should be noted that the multi-layer polarizer 48 functions to polarize light incident thereon into two planes at right angles to each other, and transmits therethrough the light rays in one plane of polarization and reflects the light rays in the other plane of polarization. Such a polarizer is well known, and may consist of a variable number of polarizing layers depending upon such factors as the index of refraction of the layers and the percentage of polarization required. Preferably, each layer is formed of suitable plastic material having a high index of refraction particularly designed to coact with the prism structure of the prism plates 32 and 34. For example, each of the layers of the multi-layer polarized 48 may be formed or cast into film form from solutions having the following composition: 45 parts polystyrene, 45 parts columarone-indene resin and 10 parts diphenyl chloride plasticizer (Aroclor). Another suitable solution is as follows: 45 parts polystyrene, 45 parts solid diphenyl chloride (Aroclor) and 10 parts liquid diphenyl chloride plastisizer (Aroclor). On the other hand, it will be realized that various other material, such as extra heavy flint glass and very small and thin glass flakes, are well known for use in such a polarizing member, and these materials are selected as the occasion demands to provide a suitable index of refraction and high degree of polarization in the particular environment involved. Inasmuch as selection of these known materials and their treatment to improve their polarization properties is primarily a matter of choice, further description is deemed unnecessary.

In this regard, the prism plates 32 and 34 may be selected from any one of various materials known for use in a polarizing assembly of this type, and the exterior surfaces of each of the prism plates may be coacted with well known anti-reflection films to reduce reflection of light back into the system, which reflection causes unnecessary circulation of the light with consequent loss of efficiency. Moreover, again in accordance with principles well known in the art, the prism structures 36 and 38 are selected in accordance with the characteristics and particularly the index of refraction of the multi-layer polarizer 48, and with due regard to Brewster's law to provide most efficient polarization. However, it has been found that 60° prisms 36 and 38 on each of the prism plates 32 and 34 are particularly useful in combination with the multi-layer polarizer 48 having an index or refraction resulting in a Brewster's angle of 60°. Such a combination provides a high degree of polarization with a maximum of light transmittance. Moreover, this combination is particularly effective since the geometry of this system, as will appear hereinafter, returns light reflected from the polarizer 48 in a direction parallel to the horizontal axis of the reflector 4, thereby facilitating its return to the polarizer.

As aforementioned, the semi-circular sheet of material 30 is commonly referred to as a wave plate, retarder or rotator. Such a member is well known and commonly employed to convert or rotate the plane of linearly polarized light to a desired extent by a process known as elliptical polarization. The function of such a member, as is well known, is based on the fact that when light is incident normally on one face of the member 30, there is no deviation of the incident rays. However, the incident light is separated into ordinary rays or waves (those obeying the ordinary laws of refraction) and extraordinary rays or waves (those not obeying such laws) which travel through the member 30 with different velocities. These rays will, therefore, be out of phase with one another upon emergence from the opposite face of the member 30 by an amount which depends on their wave lengths, on the difference in their velocities and on the thickness of the member 30. A member of such thickness that one wave gets ahead of the other by just one-quarter of a wave length is called a quarter-wave plate, and one of a thickness that one wave gets ahead of the other by one-half a wave length is called a half-wave plate. Thus, depending on the thickness of the member 30, any retardation of the extraordinary ray or wave behind the ordinary wave can be produced. If a plane polarized wave or ray passes through a one-half wave plate, the light emerging from the plate is elliptically polarized light. However, the ellipse narrows to a line; in other words, linearly polarized light results, but rotated 90° from its plane when entering the wave plate. Thus, the term half-wave plate means a plate which has a suitable bi-refringence such that incident polarized light has its plane of polarization rotated through 90° upon passing therethrough. Such half-wave plates may be in the form of a sheet or sheets of mica of appropriate thickness, or a stretched sheet of bi-refringent plastic manufactured according to presently known methods. Ordinary cellophane, such as that used for wrapping cigarette packages, is an example of such a material.

In operation, and referring particularly to FIGURE 2, it may be noted that one of the light sources such as 20, upon illumination, will cast randomized or non-polarized light indicated by the usual star-shaped symbol toward the reflecting surface of reflector 6. This ray of light, indicated at 50, is then directed forwardly parallel to the axis of the reflector and passes through the retarder or rotator 30. The light ray is rotated, but with no effect on the system inasmuch as the light entering and emerging is still randomized or non-polarized light. The ray 50 then falls incident upon the inner prism plate 32 and passes therethrough to strike the prism surface 40, thereby totally internally reflecting the ray at normal incidence through the light-emitting face 42 of the prism resulting in no refraction or bending. The light ray 50 then emerges from the prism plate and strikes the multi-layer polarizing member 48. A portion 52 of the ray 50 is polarized into the plane of the drawing, as indicated by the conventional symbol, and passes into the outer prism plate 34 normal to the light-receiving prism surface 44 thereof and is totally internally reflected by the prism surface 46, being thereby redirected into a beam having a direction parallel to the initial direction of the incident light ray 50. The portion 54 of the incident ray or beam 50 is polarized in a plane normal to the plane of the drawing, as indicated by the conventional symbol, and is reflected back toward the prisms on the inner prism plate 32 so as to have an angle of incidence thereon the same as the initial angle of incidence of the ray 50. Thus, this reflected beam 54 is directed normal to the prism surface 40 whereupon it is totally and internally reflected by the prism surface 42 and redirected back toward reflector 6 parallel to the incident light ray 50. As the reflected beam 54 passes through the retarder or rotator 30, its plane of polarization is rotated 90° into the plane of the transmitted beam 52. Thereafter, the rotated ray 56 strikes the surface of the parabolic reflector 6, passes approximately through the focus of the reflector to the opposite half of the reflector, and is then redirected toward the polarizing assembly 28. However, inasmuch as the ray 56 is now polarized in the plane which the polarizing material 48 transmits, it will now pass through the polarizer and the prism plates 32 and 34 as previously described with respect to the ray 52, and emerge from the assembly traveling parallel to the ray 52 and generally parallel to the axis of the reflector.

From the foregoing description, it will be readily apparent that light rays originating from the source 20 and initially directed to the half of the reflector 6 opposite that receiving the light ray 50 will provide substantially the same polarizing, transmitting and reflecting action. The only difference between such a ray and that previously described is that the reflected light ray or beam which is polarized in a plane normal to the plane of the drawing and corresponds to previously described ray 54 is returned to the lower half of the reflector, is then directed across the reflector to the upper half thereof, and then passes through the retarder or rotator 30 just prior to entry into the inner prism plate 32. Thereafter, this rotated reflected beam passes through the polarizer in a manner previously described with respect to the reflected and redirected beam 56.

From the foregoing, it may be seen that by utilizing a retarder or rotator 30 covering only one-half of the mouth of the reflector 6, reflected polarized light beams directed back to the reflector from the well known multi-layer polarizer 48 are rotated into phase or into the plane of polarization of the light rays transmitted by the polarizer for passage or transmittance through the polarizer upon again being redirected to the latter by the reflector. Thus, the reflected light rays need only be returned to the reflector once, and then will be permitted to pass through the polarizer to enter the light beam. The result is more efficient use of the available light from the source 20 or 22 inasmuch as use of a de-polarizer is completely avoided, and the reflected ray or beam of light is properly oriented into the plane of polarization of the transmitted light rays with only one trip back to the reflector thereby avoiding the loss of light occasioned by repeated re-reflections from the reflector as necessitated in prior systems utilizing a de-polarizer or randomizer.

While but one form of the invention has been shown and described, other forms will now be apparent to those skilled in the art. Therefore, the embodiment shown in the drawings is merely for illustrative purposes, and is not intended to limit the scope of the invention which is defined by the claims which follow.

I claim:

1. Apparatus for producing plane polarized radiation comprising a source of radiation, a radiation reflector for receiving and directing radiation from said source, a radiation polarizing medium for receiving the radiation directed by said reflector, said polarizing medium polarizing the radiation incident thereon into two different planes of polarization and transmitting therethrough the radiation in one plane of polarization and reflecting back to said reflector the radiation in the other plane of polarization for redirection toward said polarizing medium, and means located between and relative to said polarizing medium and said reflector to transmit only once and rotate the plane of polarization of said reflected radiation into the plane of polarization of said transmitted radiation prior to said reflected radiation striking said polarizing medium for transmission therethrough.

2. A polarizing lamp assembly comprising a light source, a substantially paraboloidal reflector receiving and directing light rays from said source, a polarizing member receiving incident light rays directed from said reflector, said member polarizing the light rays incident thereon into two planes angularly related to each other and transmitting therethrough the light rays in one plane of polarization and reflecting back to said reflector the light rays in the other plane of polarization for redirection toward said polarizing member, and a light-retarding member interposed between one-half of said reflector and said polarizing member to transmit and rotate the plane of polarization of said reflected light rays into the plane of polarization of said transmitted light rays for transmission through said polarizing member.

3. A polarizing lamp assembly comprising a light source, a substantially paraboloidal reflector receiving and directing light rays from said source, a polarizing medium receiving incident light rays directed by said reflector and polarizing substantially equal portions of said incident rays into respective planes angularly related to each other, said polarizing medium transmitting one portion of said rays and reflecting the other portion thereof back to said reflector for redirection to said polarizing medium, and a sheet of light-retarding material interposed between one-half of said reflector and polarizing medium for retarding said other portion of said light rays into the plane of polarization of said one portion thereof for transmission through said polarizing medium.

4. The assembly as defined in claim 2 in which the planes of polarization of said transmitted light rays and said reflected light rays are at right angles to each other, and said light-retarding member rotates the plane of polarization of said reflected light rays 90° into the plane of polarization of said transmitted light rays for transmission through said polarizing member.

5. The assembly as defined in claim 3 in which the plane of polarization of said one portion of said rays is at a right angle to the plane of polarization of the other portion thereof, and said light-retarding material retards said other portion of said light rays 90° into the plane of polarization of said one portion thereof for transmission through said polarizing medium.

References Cited in the file of this patent

UNITED STATES PATENTS 2,748,659    Geffcken et al.   ---------- June 5, 1956
2,887,566    Marks   ---------------- May 19, 1959